(12) United States Patent
Pan et al.

(10) Patent No.: US 8,908,343 B2
(45) Date of Patent: Dec. 9, 2014

(54) SYSTEM FOR ELECTRIC DISTRIBUTION SYSTEM PROTECTION AND CONTROL AND METHOD OF ASSEMBLING THE SAME

(75) Inventors: Yan Pan, Niskayna, NY (US); Wei Ren, Niskayuna, NY (US); Swakshar Ray, Guilderland, NY (US); Michael Reichard, Schenectady, NY (US); Amol Rajaram Kolwalkar, Bangalore (IN); Reigh Allen Walling, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 288 days.

(21) Appl. No.: 13/285,886

(22) Filed: Oct. 31, 2011

(65) Prior Publication Data
US 2013/0107407 A1 May 2, 2013

(51) Int. Cl.
*H02H 3/00* (2006.01)
*H02H 3/30* (2006.01)
*H02H 3/08* (2006.01)
*H02H 9/02* (2006.01)

(52) U.S. Cl.
CPC .................................. *H02H 3/305* (2013.01)
USPC ........................................... 361/84; 361/93.1

(58) Field of Classification Search
USPC .......................................................... 361/84
See application file for complete search history.

(56) References Cited

U.S. PATENT DOCUMENTS

| | | | |
|---|---|---|---|
| 5,600,526 A * | 2/1997 | Russell et al. | 361/65 |
| 6,754,597 B2 | 6/2004 | Bertsch et al. | |
| 6,845,333 B2 | 1/2005 | Anderson et al. | |
| 7,138,728 B2 | 11/2006 | LeRow et al. | |
| 2004/0010350 A1 | 1/2004 | Lof et al. | |
| 2010/0185336 A1 | 7/2010 | Rovnyak et al. | |
| 2013/0036311 A1* | 2/2013 | Akyol et al. | 713/189 |

OTHER PUBLICATIONS

Y. Pan, et al, Impact of Inverter Interfaced Distributed Generation on Overcurrent Protection in Distribution Systems, 6 pages.

* cited by examiner

*Primary Examiner* — Dharti Patel
(74) *Attorney, Agent, or Firm* — Nitin N. Joshi

(57) ABSTRACT

An electric distribution system includes at least one feeder and a protection and control system. The feeder includes at least one segment including a first end and an opposing second end. The protection and control system includes a protective device and an electric current measuring device coupled to the segment proximate each end. The system further includes at least one processor coupled in communication with the electric current measuring devices. The at least one processor is programmed to determine a difference between a synchronized first electric current measured proximate the first end and a synchronized second electric current measured proximate the opposing second end and determine a switching condition of the protective devices as a function of the difference between the synchronized first and second electric currents.

16 Claims, 6 Drawing Sheets

SYSTEM FOR ELECTRIC DISTRIBUTION SYSTEM PROTECTION AND CONTROL AND METHOD OF ASSEMBLING THE SAME

BACKGROUND OF THE INVENTION

The embodiments described herein relate generally to electric distribution systems and, more particularly, to protection systems for electric distribution systems.

Known electric power grids typically include power generation plants, transmission and distribution lines, transformers, and other devices that facilitate electric power transmission, and power delivery. After electric power is generated in the generating plants, it is transmitted for extended distances through the high voltage transmission lines to subtransmission/distribution substations. Transmission lines usually operate at voltage levels between approximately 115 kilovolts (kV) and approximately 765 kV. At the subtransmission/distribution substations, transformers reduce the high voltage at which the power has been transmitted to sub-transmission voltage levels that range from approximately 46 kV to approximately 69 kV, or to distribution voltage levels that range from approximately 12 kV to approximately 34.5 kV. Power is then transmitted through a feeder to an end customer through an electric distribution system, and before it reaches the end customer, the voltage is decreased to approximately 120V/240V by a distribution transformer.

Most known electric distribution systems include a plurality of feeders coupled to the substation transformer. The electric distribution systems may also include at least one capacitor bank, at least one voltage regulator, and at least one distributed generation (DG) device, e.g., a diesel generator and a photovoltaic source. The feeder is divided into smaller units via bus-bars, disconnect switches, reclosers, sectionalizers, and fuses, wherein such smaller units are referred to as segments. Each segment may have any number of DG devices coupled thereto.

Therefore, typically, most known electric distribution systems include a plurality of segments with a plurality of DG devices coupled throughout the segments. In the event that a fault occurs on a segment, DG devices may contribute to the fault current along with the substation. This results in a bi-directional fault current, and traditional relays sensitive to current direction may not initiate protective actions within predetermined specifications. Another issue with connection of distributed generators is that it changes the fault current of the distribution system. In other words, when you connect a distributed generator to the distribution system it will contribute to the fault current based on the power it is generating. This can lead to a failure of protection systems to detect faults when there are high levels of distributed generation. Therefore, conventional/traditional protection schemes/systems can be difficult to coordinate.

BRIEF DESCRIPTION OF THE INVENTION

In one aspect, an electric distribution system is provided. The electric distribution system includes at least one feeder including at least one segment including a first end and an opposing second end. The electric distribution system also includes a protection and control system that includes at least one protective device coupled to the at least one segment proximate each of the first end and the opposing second end. The protection and control system also includes at least one electric current measuring device coupled to the at least one segment proximate each of the first end and the opposing second end. The protection and control system further includes a processor coupled in communication with the electric current measuring devices. The processor is programmed to determine a difference between a synchronized first electric current measured proximate the first end and a synchronized second electric current measured proximate the opposing second end. The processor is also programmed to determine a switching condition of the protective devices as a function of the difference between the synchronized first and second electric currents.

In another aspect, a protection system for an electric distribution system is provided. The electric distribution system includes at least one feeder that includes at least one segment at least partially defined by a first end and an opposing second end. The electric distribution system also includes at least one distributed generation (DG) device coupled to the electric distribution system. The protection system includes at least one protective device coupled to the at least one segment proximate each of the first end and the opposing second end. The protection system also includes at least one electric current measuring device coupled to the at least one segment proximate each of the first end and the opposing second end. The protection system further includes a processor coupled in communication with the electric current measuring devices. The processor is programmed to determine a difference between a synchronized first electric current measured proximate the first end and a synchronized second electric current measured proximate the opposing second end. The processor is also programmed to determine a switching condition of the protective devices as a function of the difference between the synchronized first and second electric currents.

In yet another aspect, a method of assembling an electric distribution system is provided. The method includes providing at least one feeder including at least one segment. The at least one segment includes a first end and an opposing second end. The method also includes coupling at least one protective device to the at least one segment proximate each of the first end and the opposing second end. The method further includes coupling at least one electric current measuring device to the at least one segment proximate each of the first end and the opposing second end. The method also includes coupling a protection and control system to each of the electric current measuring devices. The method further includes configuring the protection and control system to determine a difference between a first electric current measured proximate the first end and a second electric current measured proximate the opposing second end. The method further includes configuring the protection and control system to determine a priority of switching of the protective devices as a function of the difference between the first and second electric currents.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1B:
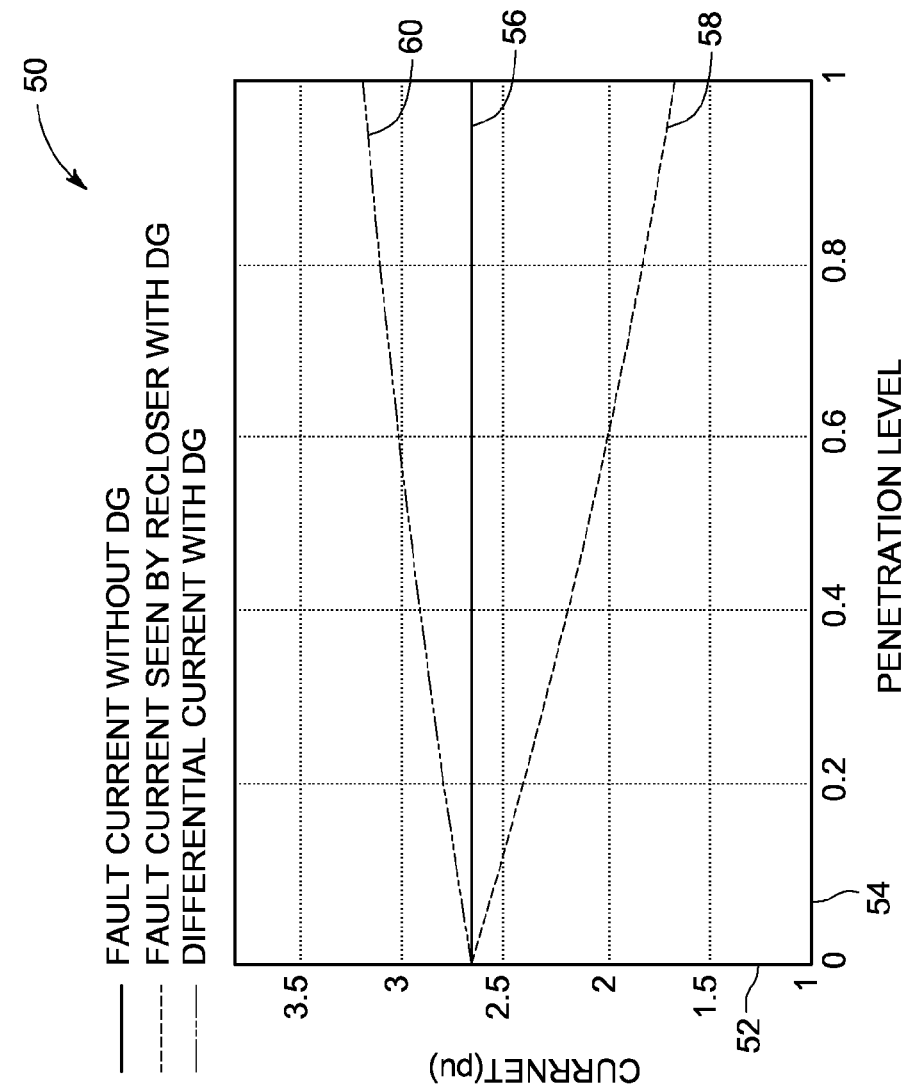
FIG. 1B is a graphical view, i.e., a graph of electric currents as a function of distributed generation penetration.
Figure 1A:
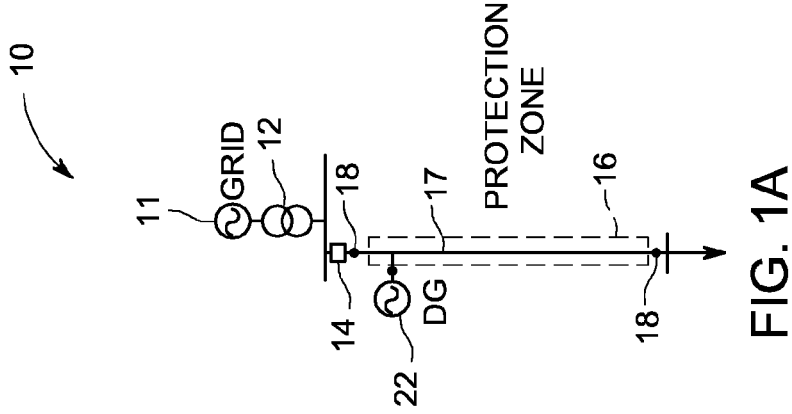
FIG. 1A is a schematic diagram of a typical conventional prior art radial distribution feeder circuit.

FIG. 1A is a schematic diagram of a typical conventional prior art radial distribution feeder circuit 10. Feeder circuit 10 is coupled to a portion of an electric power grid 11 that supplies electric power to a transmission and distribution substation 12. Electric power from substation 12 is then fed to various loads (not shown) through a feeder 17 including a plurality of power circuit breakers and/or recloser devices 14. Feeder 17 is divided into a plurality of protection zones 16 that are at least partially defines by breakers/devices 14 and electrical measurement devices 18 that include current transformers and voltage transformers. Breakers/devices 14 may be operated by an instantaneous and time overcurrent protection device such as an overcurrent relay (not shown) used to facilitate fault detection. In some embodiments, there may be multiple other overcurrent protection devices along radial distribution feeder circuit 10 that are time coordinated so that the device closest to the fault will trip the fastest. Also, in some embodiments, if a timed overcurrent scheme is applied, the settings of the overcurrent relay are such that for higher fault currents, the relay trips the recloser earlier as compared to lower fault currents. A distributed generator (DG) 22 may also be connected to feeder circuit 10. For illustrative purposes, a fault 25 is shown occurring on feeder circuit 10 within protection zone 16 downstream of DG 22.

FIG. 1B is a graphical view, i.e., a graph 50 of electric currents as a function of distributed generation penetration. Graph 50 includes a y-axis 52 that represents per-unit (pu) values of the current rating of feeder 17 (shown in FIG. 1A) extending from 1.0 pu to 3.5 pu in increments of 0.5 pu. Graph 50 also includes an x-axis 54 that represents the penetration level of DGs 22 (shown in FIG. 1A) extending from 0.0 to 1.0 in increments of 0.2. As used herein, the term "penetration level" refers to the ratio of the amount of DG-generated electric power injected into feeder 17 to the capacity of feeder 17, wherein the units of penetration level are dimensionless.

Referring to FIGS. 1A and 1B together, fault 25 occurs as shown in FIG. 1A. Since DG 22 is coupled to feeder 17 downstream of the overcurrent relay associated with breaker/device 14, and assuming DG 22 is generating and transmitting electric current into feeder 17, the overcurrent relay will sense a current value lower than the value associated with fault 25. For illustration, in FIG. 1B, a first curve 56 shows the fault current as sensed by the overcurrent relay without the current injected by DG 22. Therefore, first curve 56 is substantially constant with respect to penetration level. A second curve 58 shows the fault current as sensed by the overcurrent relay with the current injected by DG 22 increasing with penetration level. Therefore, the actual fault current sensed by the feeder relay decreases as the penetration level increases. Generally, when an overcurrent relay senses a smaller current than the actual fault current that is being fed at least partially by DG devices, a delay in response by the overcurrent relay may result, an effect sometimes referred to as "blinding of protection."

A third curve 60 in FIG. 1B shows the differential current values when electric current is measured at electrical measurement devices 18 at each end of protection zone 16. As the penetration levels of DG 22 increase, the differential current values increase as well. Therefore, while the overcurrent relay may sense a decreasing current as a function of increasing penetration levels of DG 22, differential current values maintain a high value and even increase with penetration level, thereby providing a measureable characteristic of feeder 17 having a good sensitivity.

Thus, the exemplary systems and methods described herein overcome disadvantages of known protection and control systems for electric distribution systems with distributed generation by determining a current differential between two ends of a feeder segment using precisely synchronized current measurements. Specifically, the protection and control systems only respond directly to differences in the currents entering and leaving the associated segment and provides bi-directional fault current sensing that is synchrophasor-based. Therefore, such protection and control systems are substantially insensitive to changes in fault current levels and load flow changes due to distributed generation devices coupled to the distribution system. However, such protection and control systems are sensitive to different fault impedances. Also, such protection and control systems identify affected segments quickly and accurately, and therefore facilitate an improved probability of operating the protective device that will most likely clear the fault while reducing electric power disruptions. Such operational discrimination of the associated reclosers decreases miscoordination of reclosers, fuses, and other protective devices. Moreover, by extending segmented protection and control on a segment-by-segment basis across the feeders, such protection and control systems facilitate wide-area differential protection across large portions of an electric distribution system.

Also, the exemplary systems and methods described herein overcome disadvantages of known protection and control systems for electric distribution systems with distributed generation by providing reliable primary and backup protection and control, even for constantly changing system configurations under high-penetration scenarios for distributed generation. Furthermore, such protection and control systems are scalable to include future expansions of the electric distribution system and additional penetration of distributed generation. Also, since the systems substantially rely on differential current determinations, they are substantially independent of distribution system voltages during weak grid conditions. Furthermore, such system reduces the potential effects of induction motor and transformer backfeeding into the feeder segments, thereby decreasing a potential for inadvertent operation of affected reclosers.

Figure 2:
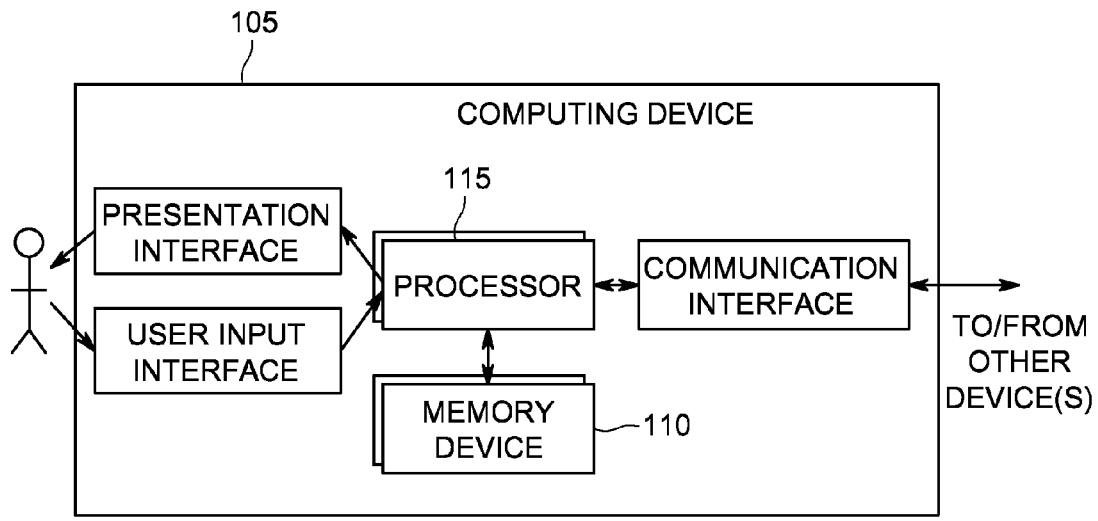
FIG. 2 is a block diagram of an exemplary computing device that may be used to monitor and/or control the operation of a portion of an electric distribution system.

FIG. 2 is a block diagram of an exemplary computing device 105 that may be used to monitor and/or control the operation of a portion of an electric distribution system (not shown in FIG. 2). Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Figure 3:
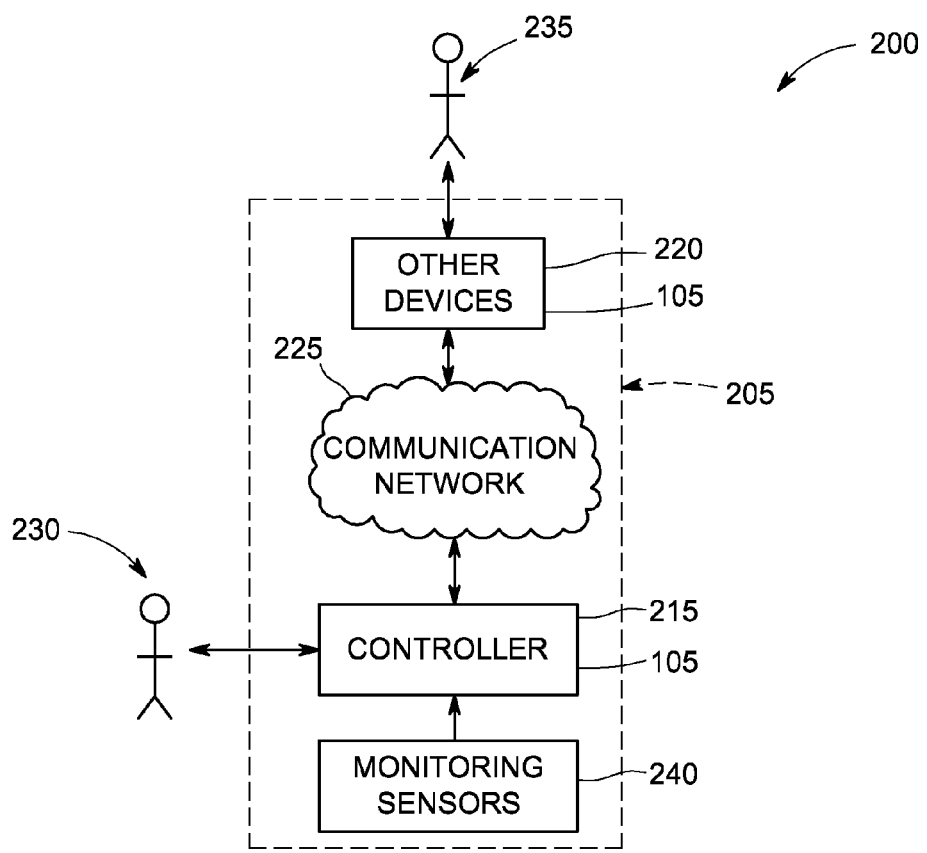
FIG. 3 is block diagram of an exemplary electric distribution protection and control system that includes an electric distribution system controller.

FIG. 3 is block diagram of an exemplary protection and control system 200 that may be used to monitor and/or operate at least a portion of an electric distribution system 205. In the exemplary embodiment, system 200 includes a substation-level centralized protection and control system controller 215 that may be coupled to other devices 220 with a communication network 225. Therefore, alternatively, rather than a centralized topology, system 200 may include a decentralized, i.e., a distributed control topology. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, controller 215 may perform all of the operations below.

Referring to FIGS. 2 and 3, controller 215 is a computing device 105. In the exemplary embodiment, computing device 105 is coupled to network 225. In an alternative embodiment, controller 215 is integrated with other devices 220. In one embodiment, controller 215 interacts directly with a first operator 230 and/or a second operator 235 through communications network 225 and/or other devices 220. In the exemplary embodiment, protection and control system 200 includes one or more monitoring sensors 240. Monitoring sensors 240 collect operational measurements including, without limitation, substation voltage and current readings, localized voltage and current readings throughout electric distribution system 205, and/or any other type of data. Monitoring sensors 240 repeatedly (e.g., periodically, continuously, and/or upon request) transmit operational measurement readings at the time of measurement. Controller 215 receives and processes the operational measurement readings. Also, controller 215 includes, without limitation, sufficient data, algorithms, and commands to facilitate centralized protection and control of electric distribution system 205 (discussed further below).

Figure 4:
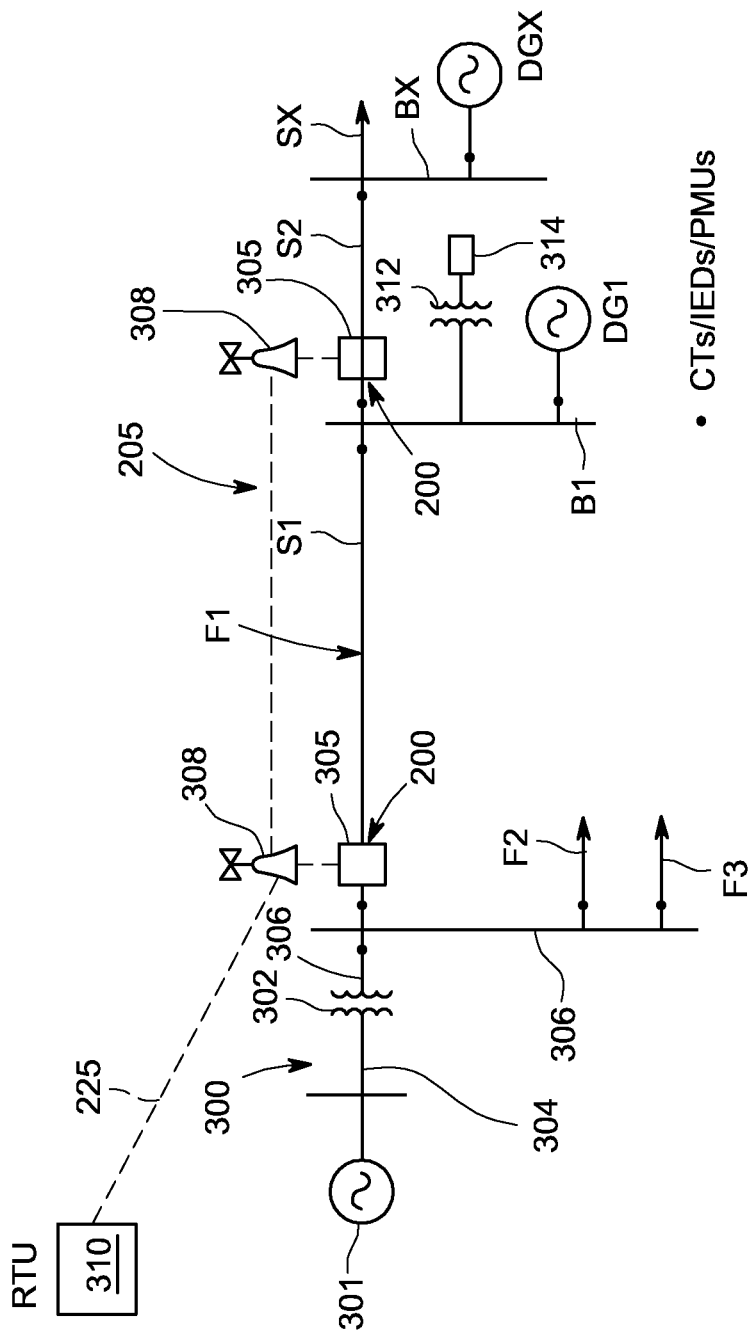
FIG. 4 is a schematic diagram of an exemplary electric distribution system and one feeder thereof.

FIG. 4 is a schematic diagram of exemplary electric distribution system 205 and one feeder F1 thereof. In the exemplary embodiment, electric distribution system 205 is a 60 Hertz (Hz) system as can be found throughout North America. Alternatively, electric distribution system 205 may be a 50 Hz system as may be found in regions of Europe. Also, alternatively, electric distribution system 205 may have any topology that enables operation of distribution system 205 as described herein, including, without limitation, a radial topology, a ring topology, and a mesh topology.

Electric distribution system 205 includes a substation 300 coupled to a larger portion of electric power grid 301. Substation 300 includes a step-down substation transformer 302 that defines a high side bus 304 and a low side bus 306. Transformer 302 transforms high side bus 304 voltage to low side bus 306 voltage within a defined range. Electric distribution system 205 includes a plurality of electric distribution sections, or feeders F1, F2, and F3, discussed further below.

In the exemplary embodiment, feeder F1 is coupled to transformer 302. Feeders F2 and F3 show how additional, similar feeders are coupled to transformer 302. Further, feeder F1 includes at least one electric power isolation device 305. Feeder F1 is divided into serialized segments S, e.g., a first segment S1, a second segment S2, and X segments SX in series, wherein X is any integer that enables operation of feeder F1 as described herein. Isolation devices 305 disconnect one section from another section, and include, without limitation, reclosers, circuit breakers, and fuses and their respective relays. Such segmentation at least partially defines a plurality of buses B, i.e., a first bus B1 coupled to segments S1 and S2 and an X Bus coupled to segments SX.

Electric distribution system 205 includes a plurality of distribution transformers 312 (only one shown). Electric distribution system 205 also includes a plurality of electric loads 314 (only one shown) coupled to each of distribution transformers 312. Distribution transformers 312 and electric loads 314 may be coupled to each of buses B1 through BX. In another embodiment, the distribution transformers 312 and loads 314 may also be tapped from feeder F1 directly rather than connecting them at the bus. Electric distribution system 205 further includes a plurality of distributed generation (DG) devices, e.g., a first DG device DG1 coupled to first bus B1 and an X DG device DGX coupled to bus BX. Distributed generation devices DG1 through DGX inject electric power into electric distribution system 205. Electric distribution system 205 includes any number of buses B1 through BX, any number of distribution transformers 312 and loads 314, and any number of distributed generation devices DG1 through DGX.

Protection and control system 200 includes sufficient computing resources and programming to facilitate operation of protection and control of electric distribution system 205 (discussed further below). The protection and control system 200 may be a centralized system located at a substation or any other appropriate location as shown in FIG. 4 or it may also be a decentralized system where each of the isolation devices 305 have its own control circuit. System 200 is coupled in communication with equipment within substation 300 and feeder F1 via a plurality of communication devices 308 (only two labeled) that may define a portion of communication network 225. Communication network 225 may also include a remote communications device, e.g., a remote terminal unit (RTU) 310 that facilitates remote communication between system 200 and communication devices 308.

Figure 5:
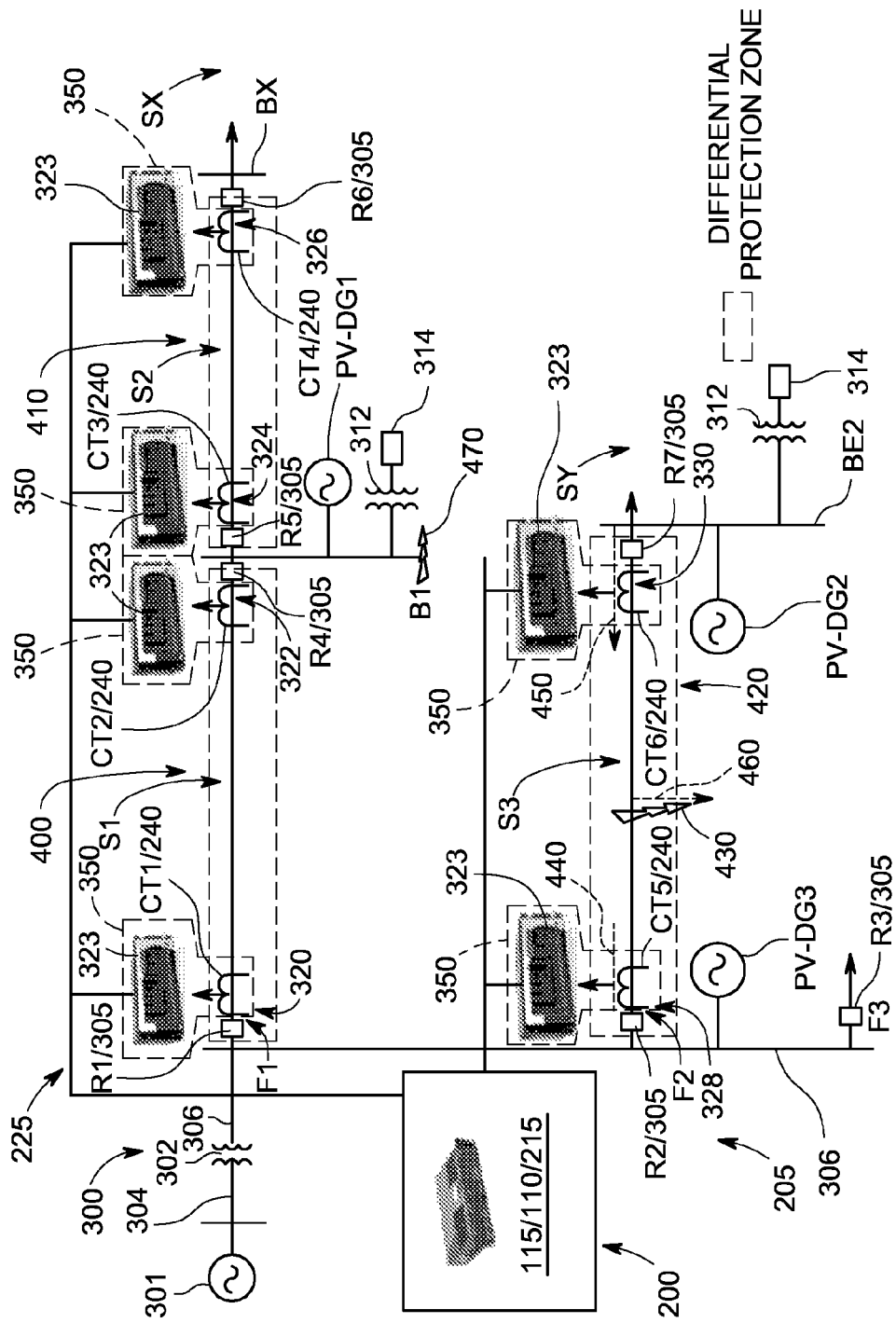
FIG. 5 is a schematic diagram of a portion of the electric distribution system and the protection and control system shown in FIGS. 3 and 3.

FIG. 5 is a schematic diagram of a portion of electric distribution system 205 and protection and control system 200. Feeders F1, F2, and F3 are coupled to substation 300 via electric power isolation devices 305, i.e., a first recloser R1, a second recloser R2, and a third recloser R3, respectively. As used herein, the terms "electric power isolation device" and "recloser" include the associated protective relays (not shown for clarity). Also, as used herein, the term "switching condition" of protective devices, e.g., reclosers refers to whether the protective device is "ON/CLOSED" or "OFF/OPEN". Feeder F1 is divided into serialized first segment S1, second segment S2, and X segments SX in series, wherein X is any integer that enables operation of feeder F1 as described herein. First bus B1 is coupled to segments S1 and S2, and a first photovoltaic distributed generation device PV-DG1 and a distribution transformer 312 with its associated electric loads 314 are coupled to first bus B1. Alternatively, any type of distributed generation device is coupled to first bus B1, including, without limitation, fossil fuel-fired generators and microturbines. A fourth recloser R4 is coupled to first segment S1 and first bus B1, a fifth recloser R5 is coupled to first bus B1 and second segment S2, and a sixth recloser R6 is coupled to segment S2 and X segments SX. Further, in one embodiment, distribution transformer 312 with its associated electric loads 314 may be directly tapped from feeder F1. Feeder F1 may include any number of buses B1 through BX, any number of distribution transformers 312 and loads 314, and any number of distributed generation devices such as photovoltaic distributed generation devices PV-DG1.

Similarly, feeder F2 is divided into a serialized third segment S3 and Y segments SY in series, wherein Y is any integer that enables operation of feeder F2 as described herein. A second bus B2 is coupled to segments S3 and SY, and second bus B2 is coupled to a plurality of electric loads 314 (only one shown) and each of associated distribution transformers 312 and a second photovoltaic distributed generation device PV-DG2. A seventh recloser R7 is coupled to third segment S3 and second bus B2. A third photovoltaic distributed generation device PV-DG3 is coupled to substation 300 on low side bus 306 between second feeder F2 and third feeder F3.

Also, in the exemplary embodiment, protection and control system 200 includes one or more monitoring sensors 240. The monitoring sensors may be synchronized phasor measurement devices (synchrophasors), e.g., a phasor measurement unit (PMU) 350 (shown in phantom). Alternatively, any combination of electrical devices that measures current and/or voltage, and/or generates and transmits synchronized current and/or voltage phasor measurement signals that enables operation of protection and control system 200 as described herein is used. In general, monitoring sensors measure provide phasor information (both magnitude and phase angle) of electrical signals according to a global time signal.

In the embodiment shown, first segment S1 includes a first end 320 that includes a first set of current transformers CT1 for measuring electric current at first recloser R1. First segment S1 also includes an opposing, second end 322 that includes a second set of current transformers CT2 for measuring electric current at fourth recloser R4. Therefore, current transformers CT1 and CT2 measure the total electric current entering as well as leaving first segment S1. Current transformers CT1 and CT2 repeatedly (e.g., periodically, continuously, and/or upon request) measure and transmit electric current readings "real-time." As used herein, in the context of measurement signal transmission, the term "real-time" refers to a substantially instantaneous receipt of a measurement signal from the time of generation and transmission of such signal.

Further, in the exemplary embodiment, current transformers CT1 and CT2 are each coupled to controller 215 via an intelligent electronic device (IED) 323 which may also have a voltage sensor (not shown) connected to it. Reclosers R1 and R4, current transformers CT1 and CT2, IEDs 323 (or PMUs 350) in conjunction with controller 215, at least partially define a first differential protection zone 400. Further, in at least some embodiments, a single controller (not shown) for each individual relay (not shown) may be used at the location of each associated recloser R1 through R7, thereby defining a distributed topology for protection and control system 200. IEDs 323 (or PMUs 350) generate and transmit voltage and current phasor signals that are substantially synchronized and time-stamped.

Controller 215 receives and processes the synchronized current phasor measurements from current transformers CT1 and CT2 via IEDs 323 (or PMUs 350) and communications network 225. In other embodiments, where distributed generators or transformers/loads are directly tapped from feeder, a current supplied by distributed generator to the feeder and current absorbed by transformer/load may also be transmitted to controller 215. Controller 215 includes, without limitation, sufficient data, algorithms, and commands to facilitate protection and control of electric distribution system 205 via reclosers R1 and R4. Specifically, controller 215 includes sufficient programming to determine a total current differential across first segment S1 and to initiate operation of reclosers R1 and R4 as necessary to facilitate clearing faults on portions of electric distribution system 205.

Similarly, second segment S2 includes a first end 324 and an opposing second end 326. Second segment's S2 reclosers R5 and R6, a pair of current transformers CT3 and CT4, and IEDs 323 (or PMUs 350), in conjunction with controller 215, at least partially define a second differential protection zone 410. Controller 215 receives and processes the synchronized current phasor measurements from current transformers CT3 and CT4 via IEDs 323 (or PMUs 350). Controller 215 then again includes sufficient programming to determine a total current differential across second segment S2 and to initiate operation of reclosers R5 and R6 to facilitate clearing faults on portions of electric distribution system 205.

Third segment S3 includes a first end 328 and an opposing second end 330. Third segment's S3 reclosers R2 and R7, a pair of current transformers CT5 and CT6, IEDs 323 (or PMUs 350), in conjunction with controller 215, at least partially define a third differential protection zone 420. Controller 215 receives and processes the synchronized current phasor measurements from potential transformers PT5 and PT6 via IEDs 323 (or PMUs 350). Further, controller 215 includes sufficient programming to determine a total current differential across third segment S3 and to initiate operation of reclosers R2 and R7 as necessary to facilitate clearing faults on portions of electric distribution system 205.

In addition to the exemplary embodiments described above, alternative embodiments may include a plurality of distributed controllers that include, without limitation, sufficient data, algorithms, and commands to facilitate distributed protection and control of electric distribution system 205 via the reclosers.

In general, protection and control system 200 uses a PMU-based differential protection scheme to determine a total current differential between the two ends of a segment using precisely synchronized current measurements. The current flowing in and the current flowing out of a segment is measured and a predetermined mismatch of the current in and out values indicate the existence of a fault on electric distribution system 205. The predetermined mismatch may be a threshold value, e.g., without limitation, if incoming current to a segment is labeled as $I_{IN}$ and outgoing current from the segments is labeled as $I_{OUT}$, and the differential value between $I_N$ and $I_{OUT}$=0, no fault is determined to exist by system 200. However, if the differential value between $I_N$ and $I_{OUT}$≥a predetermined threshold value, a fault is determined to exist between the associated reclosers that may both be opened to clear the fault. Furthermore, if some distributed generators or transformer/loads are tapped from the feeder directly, the threshold value may be based on the current supplied or absorbed by the distributed generators and transformer/loads.

For example, in the event of a fault 430 that is generated on segment S3, an inrush of electric current will be sensed by PMUs 350 within third differential protection zone 420. In one embodiment, within a three-cycle communications latency period, PMUs 350 sense an inrush of currents 440 and 450, respectively. Also, within that three cycles, PMUs 350 generate and transmit synchronized current signals proportional to current inrushes 440 and 450, respectively.

Current inrush 440 includes electric current supplied from substation 300 and additional current supplied from photovoltaic device PV-DG3. Some current may also be supplied to current inrush 440 via photovoltaic device PV-DG1 and first segment S1. Current inrush 450 includes electric current supplied from segment(s) SY and additional current supplied from photovoltaic device PV-DG2, wherein current inrush 450 is in the opposite direction of typical current flow. Therefore, a fault current 460 is bi-directional.

Controller 215 includes, without limitation, sufficient data, algorithms, and commands to determine a real-time total current differential associated with segment S3. If the determined electric current differential value is greater than a predetermined setpoint, i.e., threshold value, protective functions are commanded by controller 215, and, in the present example, reclosers R2 and R7 open.

In operation, for alternative fault scenarios, for example, a fault 470 positioned on bus B1, current from substation 300 through segment S1 and bus B1 are substantially instantaneously increased. However, photovoltaic device PV-DG1 contributes to the fault current (not shown) such that the current sensed by current transformer CT2 will not be the full fault current. Protection and control system 200 responds directly to the difference of synchronized currents sensed by current transformers CT1 and CT2 coupled to segment S1 and the difference of synchronized currents sensed by current transformers CT3 and CT4 coupled to segment S2. However, when the fault is on bus B1, then protection and control system 200 responds to a difference of synchronized currents sensed by current transformers CT2 and CT3. The increase in current through current transformer CT2 is much greater than the change in current through current transformer CT3, and controller 215 includes, without limitation, sufficient data, algorithms, and commands to determine that fault 470 does not reside on segments S1 and S2, and through the process of elimination, must reside on bus B1. Therefore, recloser R4, and possibly recloser R5, will be commanded to open and then reclose to clear fault 470, and the "blinding of protection" deficiency as described earlier will not prevent prompt fault clearing with a reduction of collateral interruption to system customers.

Further, in operation, some of electric loads 314 may include large induction motors that may generate a backfed electric current into the segment they are coupled to. Such backfeeding typically only lasts approximately three cycles prior to dying out and is typically relatively small, wherein the magnitude of the backfed current will vary inversely to the associated terminal voltage. Moreover, protection and control system 200 determines a current differential between the two ends of a segment using precisely synchronized current measurements. As such, the small amount of backfed current entering the segment coupled to the motors and the directly adjacent segments only marginally affects the differential current determination for those segments, and only for approximately three cycles prior to dying out. Therefore, reducing the potential effects of induction motor backfeeding into the feeder segments decreases a potential for inadvertent operation of affected reclosers.

Similarly, in operation, some of distribution transformers 312 may induce a backfed inrush of current that may have a magnitude approximately ten times greater than normal operating current, such current magnitude at least partially dependent upon the voltage of the segment that transformer 312 is coupled to. Such backfeeding typically only lasts approximately one to three seconds prior to decreasing to normal levels. Moreover, protection and control system 200 determines a current differential between the two ends of a segment using precisely synchronized current measurements. As such, the backfed current entering the segment coupled to the transformers 312 only marginally affects the differential current determination for that segment, and only for approximately one to three seconds prior to decreasing to normal levels. Therefore, reducing the potential effects of transformer backfeeding into the feeder segments decreases a potential for inadvertent operation of affected reclosers.

Further, in operation, protection and control system 200 determines a current differential between the two ends of a segment using precisely synchronized current measurements, and responds directly to changes in the currents entering and leaving the associated segment. Therefore, system 200 is substantially insensitive to changes in fault current levels and load flow changes.

Figure 6:
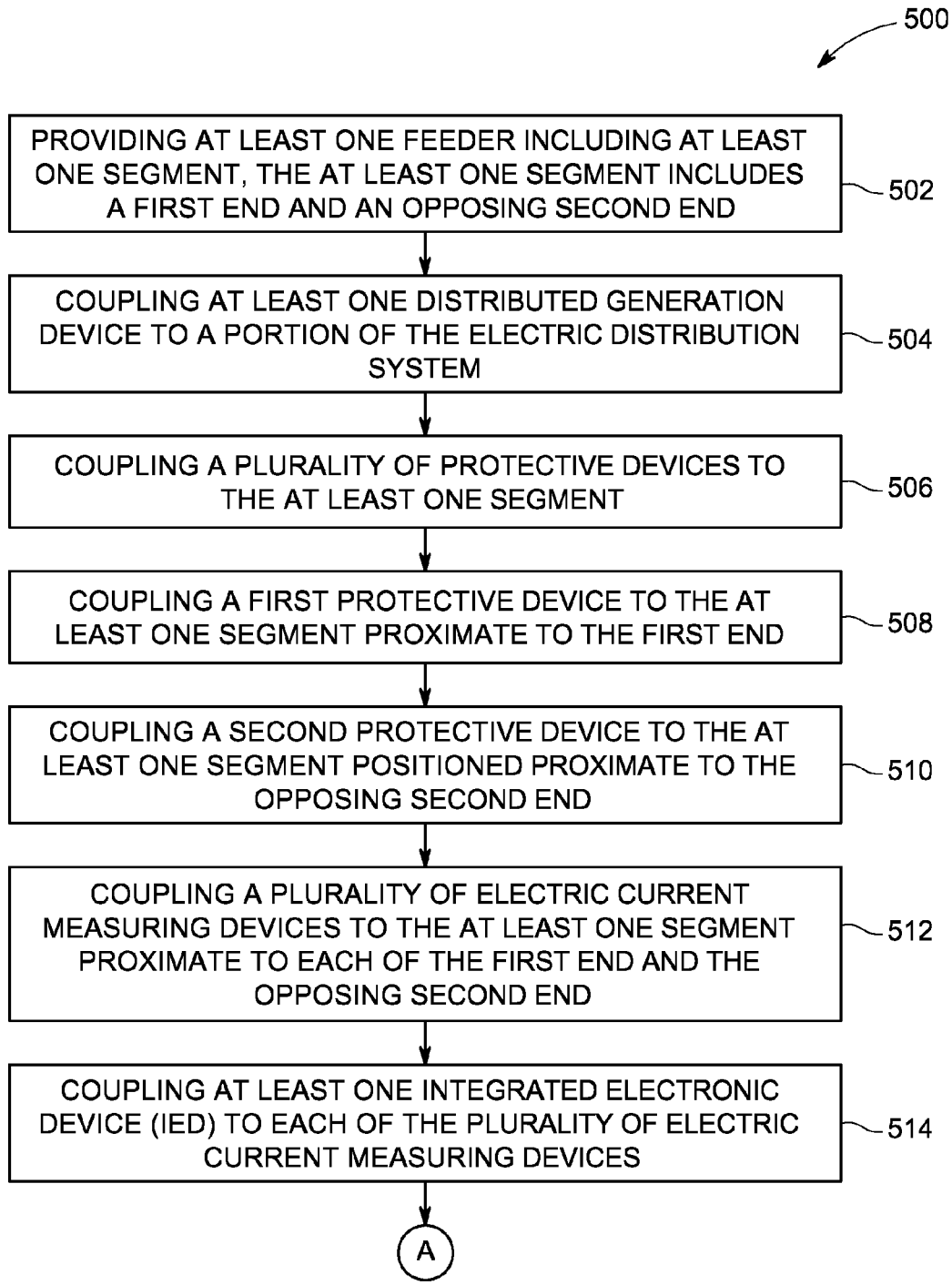
FIG. 6 is a flowchart of an exemplary method of assembling the electric distribution system shown in FIGS. 3, 4, and 5.

FIG. 6 is a flowchart of an exemplary method 500 of assembling electric distribution system 205 (shown in FIGS. 3, 4, and 5). In the exemplary embodiment, at least one feeder F1/F2/F3 (shown in FIGS. 4 and 5) including at least one segment S1/S2/S3 (shown in FIG. 5) is provided 502, wherein segment S1/S2/S3 includes a first end 320/324/328 (shown in FIG. 5) and an opposing second end 322/326/330 (shown in FIG. 5). In on embodiment, distributed generation device DG1/DG2 (shown in FIG. 4) and PV-DG1/PV-DG2/PV-DG3 (shown in FIG. 5) may be coupled 504 to a portion of electric distribution system 205. A plurality of protective devices R1/R2/R3/R4/R5/R6/R7 (shown in FIG. 5) are coupled 506 to segment S1/S2/S3. Specifically, a first protective device R1/R2/R3/R5 is coupled 508 to segment S1/S2/S3 proximate to first end 320/324/328, respectively, and a second protective device R4/R6/R7 is coupled 510 to segment S1/S2/S3 positioned proximate to opposing second end 322/326/330, respectively.

Also, in the exemplary embodiment, a plurality of synchronized electric current measuring devices 240/CT1/CT2/CT3/CT4/CT5/CT6 or PMUs 350 (all shown in FIG. 5) are coupled 512 to segment S1/S2/S3 proximate to each of first end 320/324/328 and opposing second end 322/326/330. In one embodiment, IED 323 is coupled 514 to each of electric current measuring devices 240/CT1/CT2/CT3/CT4/CT5/CT6.

Figure 7:
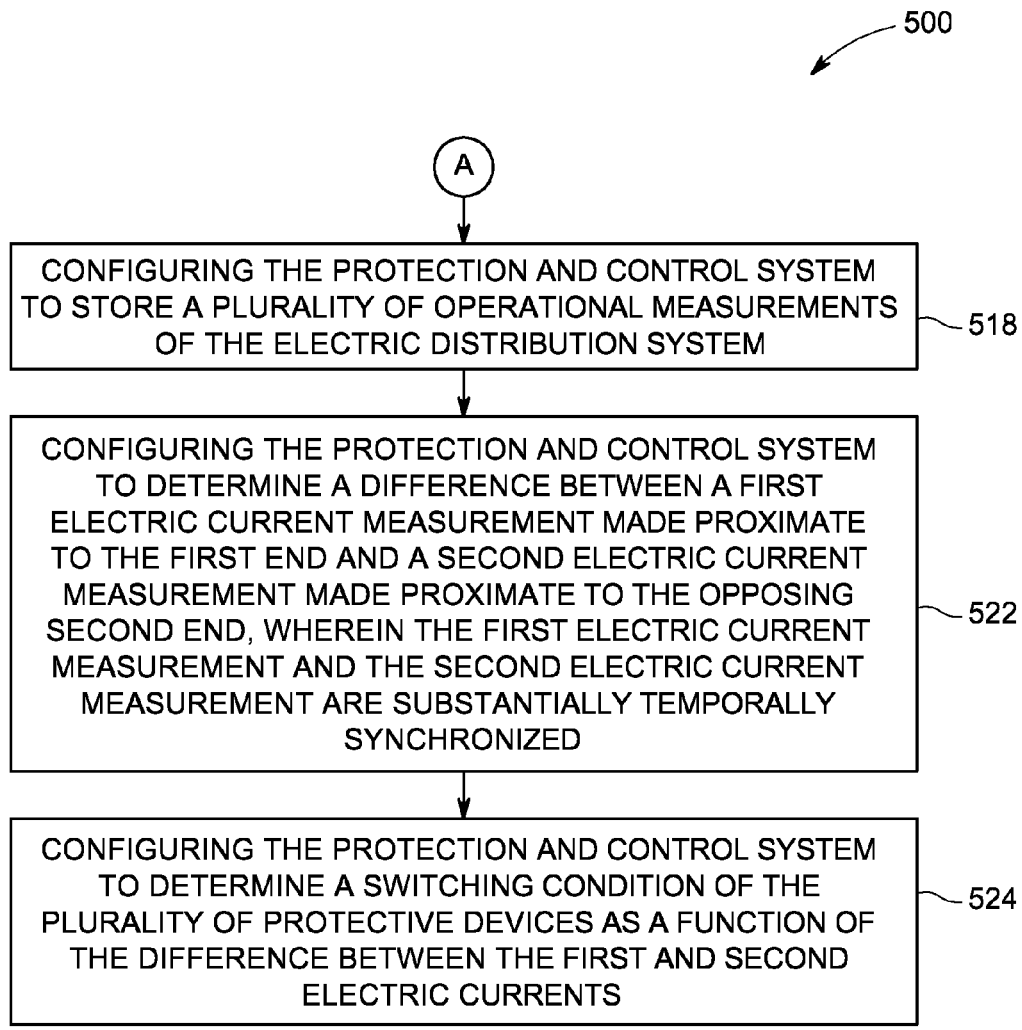
FIG. 7 is a continuation of the flowchart in FIG. 6

FIG. 7 is a continuation of the flowchart started in FIG. 6. Further, in the exemplary embodiment, protection and control system 200 is configured 522 to determine a difference between a first electric current measurement made proximate to first end 320/324/328 and a second electric current measurement made proximate to opposing second end 322/326/330, wherein the first electric current measurement and the second electric current measurement are substantially temporally synchronized. Protection and control system 200 is also configured 524 to determine a switching condition of protective devices R1/R2/R3/R4/R5/R6/R7 as a function of the difference between the first and second electric currents.

The above-described described protection and control system for an electric distribution system with distributed generation provides a cost-effective method for increasing electric power reliability and decreasing power disruptions. Specifically, the devices, systems, and methods described herein determine a current differential between two ends of a feeder segment using precisely synchronized current measurements generated by PMUs. More specifically, the devices and systems described herein only respond directly to differences in the currents entering and leaving the associated segment and provide bi-directional fault current sensing that is synchrophasor-based. Therefore, the devices and systems described herein are substantially insensitive to changes in fault current levels and load flow changes due to distributed generation devices coupled to the distribution system, while remaining sensitive to different fault impedances. Also, the devices, systems, and methods described herein identify affected segments quickly and accurately, and therefore facilitate an improved probability of operating the protective device that will most likely clear the fault while reducing electric power disruptions. Such operational discrimination of the associated reclosers decreases miscoordination of reclosers, fuses, and other protective devices. Moreover, the devices, systems, and methods described herein extend segmented protection and control on a segment-by-segment basis across the feeders, such protection and control system facilitating wide-area differential protection across large portions of an electric distribution system.

Also, the devices, systems, and methods described herein provide reliable primary and backup protection and control, even for constantly changing system configurations under high-penetration scenarios for distributed generation. Furthermore, the devices, systems, and methods described herein are scalable to include future expansions of the electric distribution system and additional penetration of distributed generation. Also, since the systems substantially rely on differential current determinations, they are substantially independent of distribution system voltages during weak grid conditions. Furthermore, such systems reduce the potential effects of induction motor and transformer backfeeding into the feeder segments, thereby decreasing a potential for inadvertent operation of affected reclosers.

An exemplary technical effect of the methods, systems, and apparatus described herein includes at least one of (a) enabling determination of a current differential between two ends of a feeder segment using precisely synchronized current measurements; (b) enabling responses directly to changes in the currents entering and leaving the associated segment; (c) enabling both (a) and (b) above while maintaining substantial insensitivity to changes in fault current levels and load flow changes due to distributed generation devices coupled to the system; (d) enabling both (a) and (b) above while maintaining sensitivity sensitive to different fault impedances; (e) enabling both (a) and (b) above, thereby enabling bi-directional fault current sensing; (f) facilitating an improved probability of operating protective devices that will most likely clear a fault while reducing electric power disruptions; (g) enabling reliable primary and backup protection and control for dynamic distribution system configurations; and (h) enabling robust protection and control independent of distribution system voltages during weak grid conditions.

Exemplary embodiments of the devices, systems, and methods for protection and control for an electric distribution system with distributed generation are described above in detail. The devices, systems, and methods are not limited to the specific embodiments described herein, but rather, components of systems and/or steps of the method may be utilized independently and separately from other components and/or steps described herein. For example, the systems and methods may also be used in combination with other protection and control systems and methods, and are not limited to practice with only the electric distribution system with distributed generation as described herein. Rather, the exemplary embodiment can be implemented and utilized in connection with many other protection and control systems and applications.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric distribution system comprising:
   at least one feeder comprising at least one segment comprising a first end and an opposing second end; and
   a protection and control system comprising:
      at least one protective device coupled to said at least one segment proximate each of said first end and said opposing second end;
      at least one electric current measuring device coupled to said at least one segment proximate each of said first end and said opposing second end; and
      at least one processor coupled in communication with each of said electric current measuring devices, said processor programmed to:

determine a difference between a synchronized first electric current measured proximate said first end and a synchronized second electric current measured proximate said opposing second end; and determine a switching condition of said protective devices as a function of the difference between the first and second synchronized electric currents.

2. An electric distribution system in accordance with claim 1, further comprising at least one distributed generation device coupled to said at least one feeder.

3. An electric distribution system in accordance with claim 1, wherein said at least one processor comprises at least one of:
a centralized controller; or
a plurality of distributed controllers.

4. An electric distribution system in accordance with claim 1, wherein said at least one processor is further programmed to:
determine the first electric current flowing into said at least one segment at said first end;
determine the second electric current flowing out of said at least one segment at said second end; and
determine a location of an electrical fault as a function of the difference between the first and second electric currents.

5. An electric distribution system in accordance with claim 1, wherein said at least one processor is further programmed to determine a location of an electrical fault as a function of a difference between the first and the second electric currents of each segment of a plurality of segments.

6. An electric distribution system in accordance with claim 1, wherein said at least one processor is further programmed to determine the switching condition of said plurality of protective devices as a function of a difference between the first and the second electric currents of each segment of a plurality of segments.

7. An electric distribution system in accordance with claim 1, wherein said protection and control system comprises a plurality of protection zones, wherein each said protective zone is defined by said first end and said opposing second end of each at least one segment.

8. An electric distribution system in accordance with claim 1, wherein said protection and control system is configured to facilitate bi-directional fault current sensing proximate each of said first end and said opposing second end.

9. A protection system for an electric distribution system, the electric distribution system includes at least one feeder that includes at least one segment at least partially defined by a first end and an opposing second end, and at least one distributed generation (DG) device coupled to the electric distribution system, said protection system comprising:
at least one protective device coupled to the at least one segment proximate each of the first end and the opposing second end;
at least one electric current measuring device coupled to the at least one segment proximate each of the first end and the opposing second end; and
at least one processor coupled in communication with each of said electric current measuring devices, said processor programmed to:
determine a difference between a synchronized first electric current measured proximate said first end and a synchronized second electric current measured proximate said opposing second end; and
determine a switching condition of said protective devices as a function of the difference between the synchronized first and second electric currents.

10. A protection system for an electric distribution system in accordance with claim 9, wherein said at least one processor comprises at least one of:
a centralized controller; or
a plurality of distributed controllers.

11. A protection system for an electric distribution system in accordance with claim 9, wherein said at least one processor is further programmed to:
determine the first electric current flowing into the at least one segment at the first end;
determine the second electric current flowing out of the at least one segment at the second end; and
determine a location of an electrical fault as a function of the difference between the first and second electric currents.

12. A protection system for an electric distribution system in accordance with claim 9, wherein said at least one processor is further programmed to determine a location of an electrical fault as a function of a difference between the first and the second electric currents of each segment of a plurality of segments.

13. A protection system for an electric distribution system in accordance with claim 9, wherein said at least one processor is further programmed to determine the switching condition of said plurality of protective devices as a function of a difference between the first and the second electric currents of each segment of a plurality of segments.

14. A protection system for an electric distribution system in accordance with claim 9, wherein said protection system comprises a plurality of protection zones, wherein each said protective zone is defined by the first end and the opposing second end of each segment of a plurality of segments.

15. A protection system for an electric distribution system in accordance with claim 9, wherein said protection system is configured to facilitate bi-directional fault current sensing proximate each of the first end and the opposing second end.

16. A method of assembling an electric distribution system, said method comprising:
providing at least one feeder including at least one segment, the at least one segment includes a first end and an opposing second end;
coupling at least one protective device to the at least one segment proximate each of the first end and the opposing second end;
coupling at least one electric current measuring device to the at least one segment proximate each of the first end and the opposing second end;
coupling a protection and control system in communication with the electric current measuring devices;
configuring the protection and control system to determine a difference between a synchronized first electric current measured proximate the first end and a synchronized second electric current measured proximate the opposing second end; and
configuring the protection and control system to determine a switching condition of the protective devices as a function of the difference between the synchronized first and second electric currents.

* * * * *